INVENTOR.
SIMON MIDDELHOEK
BY
John E. Dougherty Jr.
ATTORNEY

United States Patent Office 3,445,830

Patented May 20, 1969

3,445,830
MAGNETIC THIN FILM STORAGE DEVICES WITH ROTATABLE INITIAL SUSCEPTIBILITY PROPERTIES

Simon Middelhoek, Adliswil, Zurich, Switzerland, assignor to International Business Machines Corporation, Armonk, N.Y., a corporation of New York Filed July 9, 1965, Ser. No. 470,737
Int. Cl. G11b 5/00
U.S. Cl. 340—174 2 Claims

ABSTRACT OF THE DISCLOSURE

The memory uses as a storage medium a continuous film of isotropic magnetic material which exhibits rotatable initial susceptibilty properties. This film is isotropic, but when subjected to a DC field in excess of the coercive force, the small signal susceptibility is at a maximum in a direction perpendicular to the direction of the applied field and at a minimum in a direction parallel to the applied field. The storage elements are defined at the intersection of perpendicularly extending word and digit conductors which are energized with unipolar signals to control reading and writing in the memory.

The present invention relates to magnetic devices and more particularly to improved magnetic storage devices fabricated at memory using thin films of magnetic material which exhibit essentially isotropic properties.

Thin film magnetic storage devices have received much research and development attention because of their inherent high speed, small size and potential for mass fabrication. Though by far the primary emphasis has been centered on magnetic thin films having anisotropic properties, some work has been done on isotropic film devices. This primary emphasis on anisotropic films has been due to the fact that these films can be used in high speed applications using a rotational switching, which is much faster than the domain wall type switching used in isotropic memory devices. While much success has been achieved with uniaxial type magnetic film storage devices, there still exist creep problems due to the demagnetizing fields in such films which can result in the loss of stored information as the result of repeated memory operations. Further, due to the fact that there is some skew from the uniaxial axis in such films, problems are encountered in the registration of the drive and sense conductors in an array fabricated of uniaxial films. These problems have necessitated the fabrication of most uniaxial thin film memories using discrete films rather than the continuous sheet films which offer the greater potential for high packing density. Illustrative prior work on anisotropic thin films is described in Patents 3,030,612, issued to S. M. Rubens on Apr. 17, 1962 and 3,058,099, issued to A. M. Williams, on Oct. 9, 1962. Patent 3,092,511 issued to F. H. Edelman on Nov. 19, 1958 and Patent 3,047,423, issued July 13, 1962 to J. S. Eggenberger et al., disclose methods of fabricating isotropic films as well as some applications of these films as logical in memory devices. Work has also been done on films which are essentially isotropic in their physical form but are so prepared that the application of magnetic fields to the films induce anisotropies in certain physical properties which are rotatable. Such films are described in an article entitled "Anomalous Magnetic Films," by M. S. Cohen, which appeared in the Journal of Applied Physics, vol. 33, No. 10, October 1962, pages 2968–2980.

The present invention provides improved magnetic storage devices as well as arrays of storage devices using to advantage isotropic films which are operated in a simple high speed mode. More specifically, the thin film devices of the present invention are fabricated of isotropic film elements, which have rotatable initial susceptibility properties, in which binary storage is achieved using two remanent magnetic states which are separated from each other by a relatively small angle. Writing and reading operations in a memory array using the improved storage devices is achieved with a minimum of two conductors, each of which need be energized with only a single type of unipolar signal. At the same time, high speed switching operations are achieved. Since the coercive force of the films employed are high, thereby minimizing the demagnetizing effects and since there is no dependance on a physical easy axis in the film for proper operation, this high speed type memory array can be fabricated using a continuous sheet of magnetic material.

In the preferred embodiment of the invention discussed herein by way of example, a particular type of essentially isotropic film is employed which is termed a rotatable initial susceptibility (RIS) film. These films have the unusual property that though they exhibit the same magnetic properties in all directions during, for example, a normal hysteresis type test, it is possible to induce a type of anisotropy in the film. Thus, when a DC field is applied to such a film in excess of the coercive force for the film, the small signal susceptibility thereafter exhibited by the film is at a maximum in a direction perpendicular to the direction of the applied DC field and is at a minimum parallel to the applied DC field. The film, therefore, in this state behaves as if it had an easy axis in the direction of the previously applied field. This characteristic is a temporary one and can be changed or rotated by the application of a field of sufficient magnitude in another direction. These characteristics of RIS films are employed to advantage in the practice of the present invention.

It is an object of the present invention to provide improved magnetic storage arrays.

It is another object of this invention to provide improved magnetic thin film storage arrays which can be operated at high speeds under the control of unipolar signals applied to the drive conductors.

It is a further object of this invention to provide an improved magnetic thin film memory array having a high density of storage devices which can be fabricated using a continuous sheet of magnetic material.

It is a further object of this invention to provide an improved magnetic storage array which has a low disturb sensitivity and which can be operated repeatedly without the loss of stored information.

It is a more specific object of this invention to provide an improved magnetic thin film array capable of high speed operation which employs thin magnetic films having isotropic properties.

It is a more specific object of this invention to provide such an array using to advantage the properties of rotatable initial susceptibility films.

The foregoing and other objects, features and advantages of the invention will be apparent from the following more particular description of preferred embodiments of the invention, as illustrated in the accompanying drawings.

Figure 1:
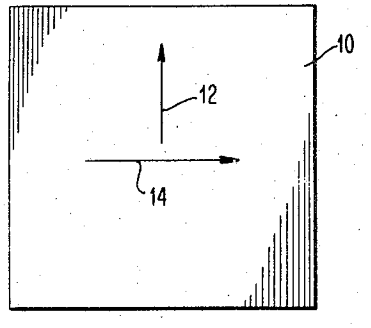
FIG. 1 is a schematic view of an isotropic film.

Referring now to FIG. 1, there is shown a planar view of a magnetic thin film 10. The film 10 is formed to have essentially isotropic properties, by which it is meant that the properties of the film are essentially the same in every direction. More specifically, the film of FIG. 1 exhibits a relatively high remanence and a hysteresis loop obtained by measuring the magnetization in the film as a result of an applied field in any direction is essentially square. Thus, for example, the hysteresis loop obtained by applying an alternating field in the vertical direction indicated by arrow 12 in FIG. 1 is essentially square. The same is true if the applied field and the measurements are made in the horizontal direction indicated by arrow 14, or at any angle to the vertical and horizontal direction. In this respect, the isotropic film 10 of FIG. 1 differs from the normal type films usually used in memory applications which exhibit uniaxial anisotropy, that is, such films are prepared to have a preferred direction or axis of magnetization along which the magnetic moments are aligned in the absence of an applied field. In such a film, the hysteresis loop obtained by making measurements along different axes of the films are very different one from the other.

Though the present invention may be practiced using purely isotropic films, the preferred embodiment, described herein by way of example, employs a film having rotatable initial susceptibility properties. This type of film is hereinafter referred to as an RIS film. Such a film, as is the case with the isotropic film, exhibits the same hysteresis loop characteristics in all directions when measured with an applied alternating field having an intensity greater than the coercive force of the film. An RIS film has the additional property that the magnetic susceptibility of the film measured in response to small signals, depends upon the fields previously applied to the film. For example, referring to FIG. 2, in which an RIS film 16 is shown, when there is applied to this film in the vertical direction indicated by arrow 18, a field in excess of the coercive force for the film, the magnetization in the film is aligned in this direction. When the field is removed the magnetization remains aligned in the vertical direction. The susceptibility of the RIS film, after the application of such a field, differs for fields applied in different directions. Thus, the susceptibility in the vertical direction of the initially applied field is at a minimum value approaching zero whereas the susceptibility in the horizontal direction, that is at 90° to the original applied field, is at a maximum value. In this regard, such a film behaves like an anisotropic film having an easy axis parallel to the direction of the originally applied DC field. The applied field therefore, produces an anisotropy in the film.

This difference in susceptibility and induced easy axis characteristic is not permanent and can be changed by the application of fields in excess of the coercive force in different directions to the film. If a field is applied in a direction indicated by the arrow 22, and that DC field removed, the magnetization within the film is oriented in the direction of the applied field. Thereafter, the small signal susceptibility of the film is minimum parallel to the direction of arrow 22 and maximum in a direction at right angles to this arrow. Thus, it can be seen by applying fields, in excess of the coercive force in any particular direction, anisotropy can be induced in an RIS film, the anisotropy being related to the susceptibility characteristics of the film.

Figure 2:
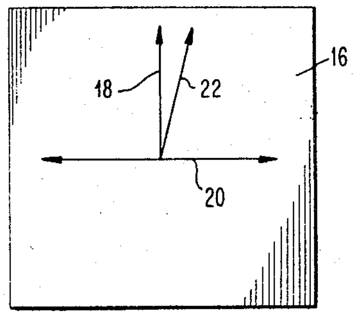
FIG. 2 is a schematic view of a film having rotatable initial susceptibility properties.

In the present invention, an RIS film of the type shown in FIG. 2 is employed as a storage device which has two stable states of remanent magnetization. The first state herein termed the "0" state is in the vertical direction indicated by the arrow 18. The second state herein termed the "1" state, is in the direction indicated by the arrow 22, which direction is rotated from the vertical by an angle of approximately 14°. The film is set in the "0" state by applying to the film a vertical field in excess of the coercive force for the film to cause the magnetization to be remanently oriented in the vertical direction represented by arrow 18. When it is desired to write a "1" in the film the same vertical field in excess of the coercive force is applied in conjunction with a small horizontal field in a direction to the right in FIG. 2. For the angle of 14° described above between the magnetization states of a binary "0" and a binary "1," the horizontal field has an intensity one fourth that of the vertical field and is appreciably less than the coercive force.

The above described combination of vertical and horizontal fields orient the magnetization in the film in the direction indicated by arrow 22 and because of the essentially isotropic nature of the film, the coercive force having been exceeded, the magnetization remains oriented in this direction upon termination of these fields. The vertically applied field which in itself exceeds the coercive force, can be terminated before or at the same time as the termination of the smaller horizontally applied field but never after.

Readout of the film device 16 in FIG. 2 is accomplished by applying a word field similar to the field described above in the vertical direction. When this field is applied with the film in the binary "0" state, that is with the magnetization oriented in the vertical direction of arrow 18, no appreciable change in flux is produced, the susceptibility in this direction being essentially zero. No output is then produced on a sense conductor arranged adjacent to the film. When, however, the readout vertical field is applied to the film while it is storing a binary "1" and magnetized in the direction of arrow 22, the readout field changes the magnetization to the vertical direction. This flux change can be detected by a sense conductor arranged adjacent to the film and extending parallel to the vertical direction indicated by arrow 18.

Read, write, and sense operations in a storage device using the film 16 of FIG. 2, require only two conductors. Further, each conductor need be energized with only a single type of unipolar signal. The first conductor is energized with unipolar signals which provide vertical fields in excess of the coercive force for the film. The second conductor is energized with unipolar signals to apply the necessary horizontal fields to the film. Readout is accomplished by energizing the first conductor by itself, in which case, the second conductor can be used as a sense conductor. If desired, a separate sense conductor extending vertically and parallel to the digit conductor can be employed.

Figure 3:
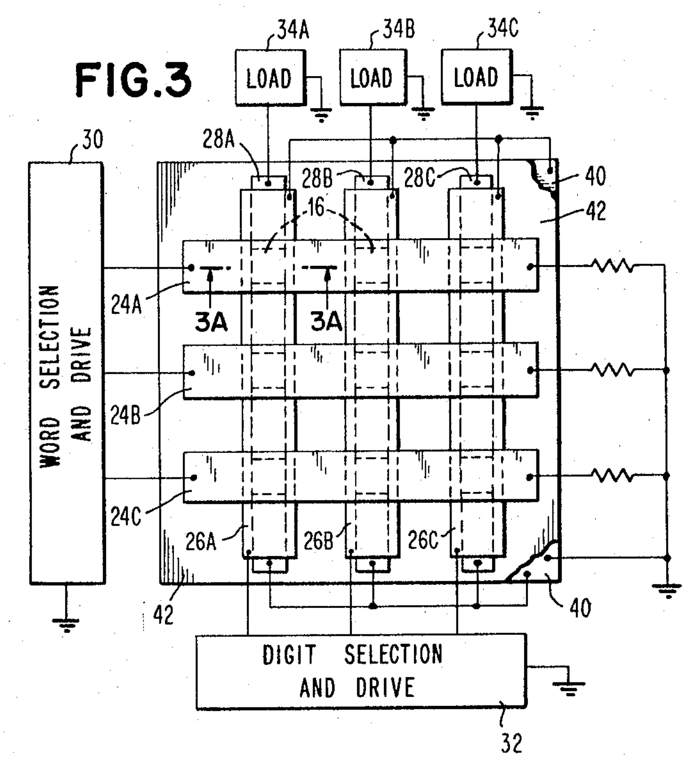
FIG. 3 is a schematic representation of a magnetic memory array according to the present invention which is fabricated of discrete magnetic films.

A matrix made up of films having the RIS characteristics 16 of FIG. 2 are shown in FIG. 3. Nine such films 16 are shown in this figure arranged in a coordinate array. Three word conductors designated 24A, 24B and 24C are provided, one for each horizontal row of the memory. Three digit drive conductors 26A, 26B, and 26C are provided, one for each vertical column of the memory. In the embodiment of FIG. 3, separate sense conductors, one for each vertical column, designated 28A, 28B, and 28C are also provided. The word conductors 24A, 24B, and 24C are selectively driven by word selection and drive circuitry generally designated 30. The digit drive conductors are similarly driven by digit selection and drive circuitry generally designated 32. The outputs for the memory are taken at loads designated 34A, 34B and 34C which are connected to the sense conductors 28A, 28B and 28C.

Figure 3A:
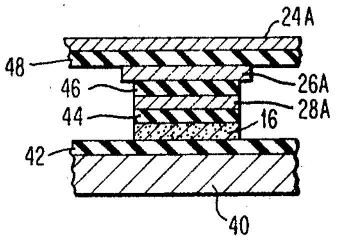
FIG. 3A is a cross-sectional view of a memory element in FIG. 3.
Figure 5:
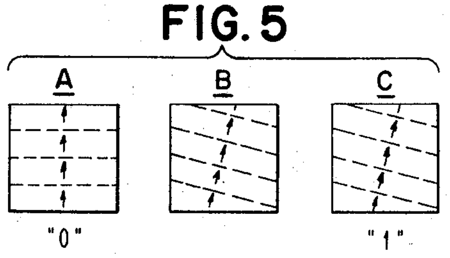
FIGS. 5, 6, 7, 8, 9 and 10 illustrate pulse patterns for reading and writing operation of memory arrays of the present invention and the resulting magnetic orientation within the storage devices of the array.

A cross-sectional view of one of the memory storage devices of FIG. 3 is shown in FIG. 3A. The memory device is formed above a ground plane 40 above which there is a layer of insulating material 42. The RIS magnetic film 16 is formed above insulating layer 42. Sense conductor 28A is formed above film 16 and separated from the film by a layer of insulating material 44. Another layer of insulating material 46 separates sense conductor 28A from digit drive conductor 26A. The uppermost conductor is the word drive conductor 24A, which is separated from the sense conductor 26A by a further layer of insulating material 48. In the operation of a magnetic memory array of the type shown in FIG. 3, certain criteria must be met. First of all, it must be possible to write either a binary "1" or a binary "0" at any location in the array; secondly, it must be possible to read out the information stored in any element in the array; and thirdly, it must be possible to carry out repeated reading and writing operations on any word in the array, a word being formed by the combination of storage devices along a horizontal row, without in any way affecting the information stored in the other horizontal rows in the array.

Figure 6:
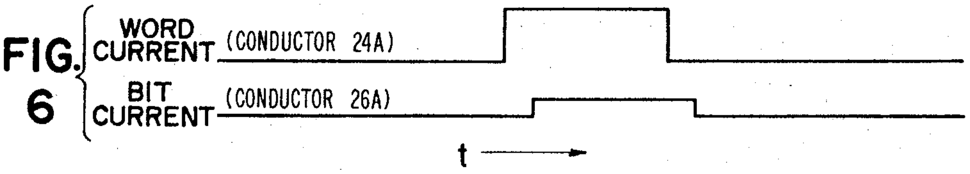
Figure 7:
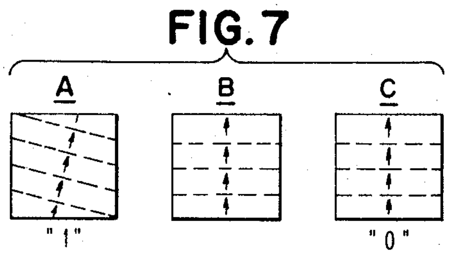

The manner in which these criteria are realized in the embodiment of FIG. 3 is best understood by a consideration of the pulse patterns and magnetic orientations shown in FIGS. 5, 6, 7, 8, 9 and 10. If it is assumed for purposes of illustration that the memory device employing the film 16 at the upper left end corner of the array of FIG. 3 originally has its magnetization oriented vertically and is therefore storing a binary "0," the magnetic state of this device is as shown in FIG. 5A. If at this time, conductor 24A is energized as shown in FIG. 6 to apply a vertical field parallel to the direction of initial magnetization, no change is effected. However, if the digit drive line 26A is then energized (FIG. 6) to apply a magnetic field in the horizontal direction, this field being essentially one-fourth of the field applied in the vertical direction, these combined fields produce an orientation of magnetization at about 14° to the vertical as is indicated in FIG. 5B. When the word drive current applied to conductor 24A and the digit drive current applied to 26A are removed, the magnetization remains in the direction produced by the combined fields applied to the film element 16 as a result of the energization of these conductors. This is shown in FIG. 5C, which is the binary "1" state of the device.

Figure 8:
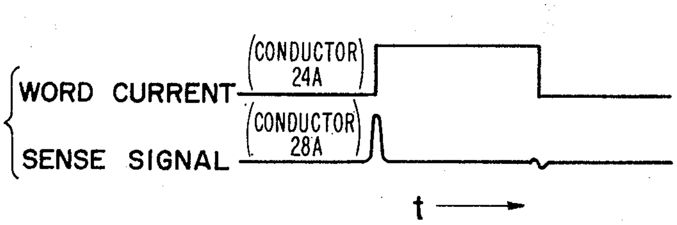

The storage device can be interrogated by energizing the word conductor 24A for the upper row of the memory array of FIG. 3 with a pulse as is shown in FIG. 8. Initially, as is shown in FIG. 7A, the magnetization is oriented at a slight angle to the vertical as a result of the binary "1" write operation. When the conductor 24A is energized under control of the selection and drive circuitry 30 of FIG. 3A, the pulse applied to this conductor produces a vertical field in excess of the coercive force for the magnetic material of film 16. This field orients the magnetization to the vertical direction indicated in FIG. 7B and this change in orientation of the flux produces a change in the flux linkage about the vertically extending sense conductor 28A, thereby producing an output pulse indicative of a binary "1." Upon termination of the drive signal applied to conductor 24A, the magnetization remains oriented in the vertical direction and thus, the interrogation or readout operation is destructive in that after each readout operation, the magnetic storage device is returned to its binary "0" state.

Figure 9:
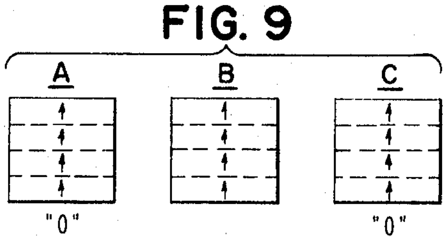
Figure 10:
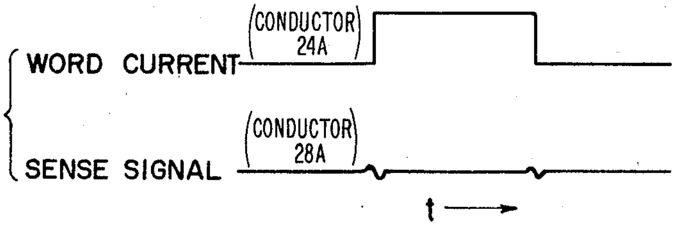

When with the storage device in the binary "0" state an interrogation operation is performed by again energizing conductor 24A, the operation is shown in FIGS. 9 and 10. FIG. 9A shows the film in its initial binary "0" state and FIG. 9B indicates that the vertically applied field does not produce any appreciable change in magnetization and therefore, no appreciable output is produced on sense conductor 28A. Upon termination of the interrogation signal on conductor 24A, the storage device remains in the binary "0" state with its magnetization in the vertical direction. From the above, it can be seen that in the operation of the arrays of FIG. 3, a word mode operation is realized. By this, it is meant that each time one of the conductors 24A, 24B or 24C is energized for either a reading or writing operation, all of the storage elements in the row associated with the energized conductors are affected. Thus, when conductor 24A is energized, each of the storage devices in the upper row of the memory is interrogated and set to the binary "0" state unless the associated digit drive line 26A, 26B or 26C is also energized to write a binary "1."

During a write operation when a binary "1" is to be written in any particular storage devices in the same column but in other rows of the array are subjected to the horizontal field produced by energization of the digit drive line. Thus, for example, when a "1" is to be written in the storage device 16 in the upper left hand corner of FIG. 3, word drive conductor 24A and digit drive conductor 26A are energized as shown in FIG. 6. As a result of the energization of conductor 26A a horizontal field is applied to the other two unselected storage films in the first column of the memory. At this time, conductors 24B and 24C are not energized, so that the unselected storage films at this time are subjected only to this small horizontal field and a small stray field due to the energization of conductor 24A. However, due to the fact that the combination of stray word field and the digit field is of insufficient magnitude to produce a reversible change in magnetization, the information stored in these two storage devices, whether it be a binary "1" or binary "0," is not disturbed. Further, the RIS films of the preferred embodiment, as described above, act like films having an easy axis along the direction of the last applied DC field in excess of the coercive force. The applied horizontal fields produce only small reversible rotations of the moments and upon removal of the horizontal fields the films reassume the initial state with the moments aligned either in the vertical direction representing a binary "0" or at a slight angle to the vertical and representing a binary "1." Because of the characteristics of these films, it is possible to carry out repeated writing operations in any one or more rows of the memory without disturbing the information stored in the remaining rows of the memory. It should be further pointed uot that with the small angles through which the rotation is changed to switch the films between storage states high speed switching of essentially a rotational type is achieved, and therefore the memory can be used in high speed computer applications.

Because of the fact that the isotropic and RIS magnetic thin film storage devices of the subject invention exhibit relatively high coercive forces and a high degree of remanence, it is possible to store appreciable magnetization in these films so that significant output pulses are realized even though the magnetic film element is extremely small. The high coercive force of the film, of course, minimizes the possibility of information being changed as a result of demagnetization forces. Therefore, creep problems which result in the loss of stored information in the conventional type magnetic films are avoided. Further, because of the isotropic nature of the films where the only anisotropy is induced by the applied fields, skew and dispersion problems are also eliminated. Further, because of the high coercive force exhibited by the magnetic thin films of the type to which this invention is directed, it is possible to fabricate a storage array using a single film of magnetic material rather than discrete elements of the type shown at 16 in FIG. 3.

Figure 4:
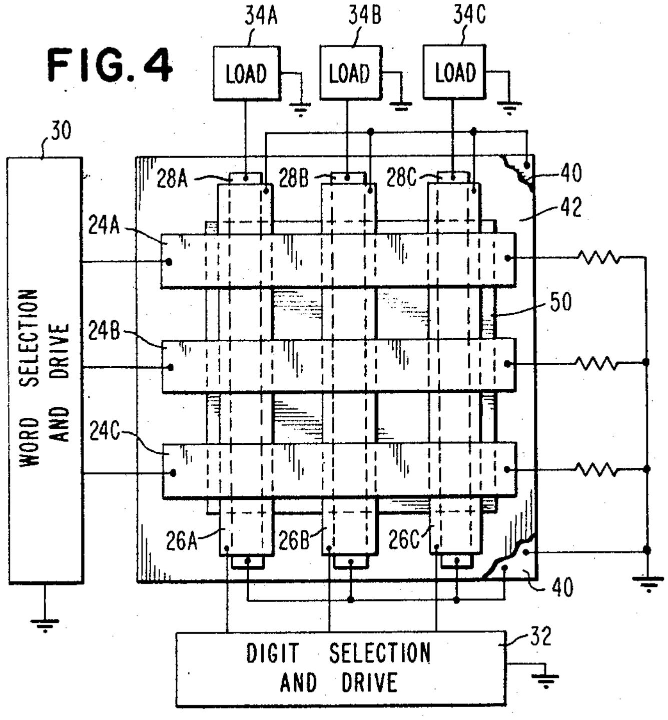
FIG. 4 is a further embodiment of a memory array constructed according to the present invention using a continuous sheet of magnetic material.

A continuous film embodiment is shown in FIG. 4 wherein corresponding elements receive the same reference numerals as are used in FIG. 3. The only difference between the embodiments of FIGS. 3 and 4 is that in FIG. 4 a continuous sheet of magnetic material designated 50 is provided instead of the discrete elements 16 of FIG. 3. The storage devices in the sheet are defined at the intersections of the vertically extending digit drive and sense conductors 26A, 26B and 26C and 28A, 28B, and 28C with the horizontal extending word drive conductors 24A, 24B and 24C. Because of the attributes of the magnetic thin films used in the practice of this invention as described above, it is possible to locate these conductors very close to each other and, therefore, achieve a high density of storage devices using a single film of magnetic material as the storage medium. Again, since the devices do not depend for their operation on anisotropic characteristics of the film in a particular physical direction, registration problems between the conductors and the films are eliminated. Further, as has been discussed above, with particular reference to FIGS. 5 through 10, the film is operated entirely using unipolar word drive signals and unipolar digit drive signals. The outputs are also unipolar in that the output for a binary "1" is always in the same sense and that for a binary "0" is essentially 0.

Though in the embodiments of the invention described above the binary "1" and binary "0" states were separated only by a rotation of 14°, the horizontal digit field being essentially one fourth of the vertically applied word field, it is possible to operate storage devices of this invention where the binary "1" and binary "0" states are separated by a greater angle. Thus, for example, the digit signals may approach in intensity, one half of the intensity of the word signals in which case a rotation of about 26° is attained. The greater the angular difference between the binary "1" magnetization and the binary "0" magnetization, the greater is the output. However, it is preferable to maintain this angle at a sufficiently small value to ensure high speed switching between storage states and good disturb sensitivity in the operation of the memory array.

While the invention has been particularly shown and described with reference to preferred embodiments thereof, it will be understood by those skilled in the art that various changes in form and details may be made therein without departing from the spirit and scope of the invention.

What is claimed is:

1. A magnetic memory comprising:

(a) a plurality of thin film storage devices arranged in columns and rows, each film including a thin film of magnetic materials having rotatable initial susceptibility properties, and each film exhibiting essentially the same coercive force, (b) each of said thin films being a part of a continuous sheet of magnetic material;

(c) a plurality of word conductors, one for each row of said memory extending in a first direction adjacent the thin films in that row of the memory;

(d) a plurality of digit conductors, one for each column of said memory extending in a second direction essentially perpendicular to said first direction adjacent the thin films in that column of the memory, (e) first unipolar drive means connected to said word conductors;

(f) second unipolar drive means connected to said digit conductors;

(g) said first unipolar drive means being the only drive means connected to said word conductors and being effective to apply only pulses of one polarity and a first magnitude to selectively energize said word conductors to cause each word conductor energized to apply a magnetic field of a first intensity in excess of the coercive force in said second direction to the thin films in the row adjacent the word conductor;

(h) said second unipolar drive means being the only drive means connected to said digit conductors and being effective to apply only pulses of one polarity and a second magnitude to selectively energize said digit conductors to cause each digit conductor energized to apply a magnetic field of a second intensity in said first direction to the thin films in the column adjacent the digit conductor;

(i) said second intensity fields applied by said digit conductors being equal to or less than one half of said first intensity fields applied by said word conductors, and each said film having a first storage state with its magnetization oriented in said second direction and a second storage state with its magnetization oriented at an angle equal to or less than 26 degrees from said second direction;

(j) output sense means connected to said digit conductors;

(k) and read-write control means for said means for writing information in said memory by controlling said first unipolar drive means to apply a pulse to a selected one of said word conductors and said second unipolar drive means to coincidentally apply pulses to selected ones of said digit conductors, and for reading information out of said memory by controlling said first unipolar drive means to apply a pulse only to a selected one of said word conductors.

2. The memory of claim 1 wherein the intensity of said second intensity fields applied by said digit conductors is about one quarter the intensity of said first intensity fields applied by said word conductors, and said second storage state of each film is one in which the magnetization is about 14 degrees from said second direction.

References Cited

UNITED STATES PATENTS

| | | | |
|---|---|---|---|
| 3,047,423 | 7/1962 | Eggenberger et al. ---- | 340—174 |
| 3,337,856 | 8/1967 | Bate et al. ---------- | 340—174 |

OTHER REFERENCES

Anomalous Magnetic Films, Cohen, M. S., Jour. of Applied Physics, vol. 33, pages 2968–2980, October 1962.

BERNARD KONICK, *Primary Examiner*.

BARRY L. HALEY, *Assistant Examiner*.